United States Patent
Lin et al.

(10) Patent No.: US 12,209,037 B2
(45) Date of Patent: Jan. 28, 2025

(54) WASTEWATER TREATMENT SYSTEM AND CLEANING METHOD THEREOF

(71) Applicant: Industrial Technology Research Institute, Hsinchu (TW)

(72) Inventors: Guan-You Lin, Hsinchu County (TW); Yi-Fong Pan, Kaohsiung (TW); Sin-Yi Huang, Miaoli County (TW); Hsin-Ju Yang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 486 days.

(21) Appl. No.: 17/486,932

(22) Filed: Sep. 28, 2021

(65) Prior Publication Data

US 2022/0340455 A1    Oct. 27, 2022

(30) Foreign Application Priority Data

Apr. 26, 2021 (TW) ................................. 110114896

(51) Int. Cl.
*C02F 1/461* (2023.01)
*C02F 1/00* (2023.01)
*C02F 1/469* (2023.01)

(52) U.S. Cl.
CPC .......... *C02F 1/46109* (2013.01); *C02F 1/008* (2013.01); *C02F 2001/46119* (2013.01);
(Continued)

(58) Field of Classification Search
CPC ........................................... C02F 1/46–1/4698
See application file for complete search history.

(56) References Cited

U.S. PATENT DOCUMENTS 3,900,377 A * 8/1975 Enns .................... C02F 1/46104
588/303
5,244,547 A * 9/1993 Clifford ................. B01D 61/42
423/586
(Continued)

FOREIGN PATENT DOCUMENTS

| CN | 103341322 | 10/2013 |
| CN | 103386254 | 11/2013 |

(Continued)

OTHER PUBLICATIONS

"Office Action of China Counterpart Application", issued on Jul. 20, 2023, p. 1-p. 7.

(Continued)

*Primary Examiner* — Alexander W Keeling
(74) *Attorney, Agent, or Firm* — JCIPRNET

(57) ABSTRACT

Provided are a system for treating wastewater and a cleaning method thereof. The wastewater treatment system includes: a wastewater compartment, a first electrode, a second electrode, an acid compartment, a base compartment, an acid supply apparatus, a base supply apparatus, a control apparatus, and a power supply device. During the cleaning process, the power supply device provides reverse potential to the first and the second electrodes. The control apparatus shut off a first channel so that the acid supply apparatus provides an acid solution to the base compartment through a second channel, and shut off a third channel so that the base supply apparatus provides an alkaline solution to the acid compartment through a fourth channel, without shutting off the wastewater treatment system.

16 Claims, 6 Drawing Sheets

(52) U.S. Cl.
CPC ... *C02F 1/4693* (2013.01); *C02F 2201/46115* (2013.01); *C02F 2201/46135* (2013.01); *C02F 2201/4614* (2013.01); *C02F 2209/03* (2013.01)

(56) References Cited

U.S. PATENT DOCUMENTS

| | | | |
|---|---|---|---|
| 6,221,225 B1 * | 4/2001 | Mani | C01D 7/34 204/531 |
| 9,937,471 B1 * | 4/2018 | Eisaman | B01D 61/465 |
| 10,266,430 B2 | 4/2019 | Yin et al. | |
| 2010/0059378 A1 * | 3/2010 | Elson | C02F 1/4691 204/520 |
| 2013/0092558 A1 * | 4/2013 | Kim | C02F 1/4618 205/743 |
| 2019/0322558 A1 * | 10/2019 | Goel | C02F 3/341 |
| 2020/0230555 A1 | 7/2020 | Gonz Lez Vogel et al. | |

FOREIGN PATENT DOCUMENTS

| | | | |
|---|---|---|---|
| CN | 103787471 | 5/2014 | |
| CN | 209188538 | 8/2019 | |
| CN | 210595395 | 5/2020 | |
| CN | 111672326 | 9/2020 | |
| JP | 2002080857 | 3/2002 | |
| JP | 2010269288 | 12/2010 | |
| JP | 2012035176 | 2/2012 | |
| KR | 102044195 B1 * | 12/2019 | ............ C02F 1/4693 |
| TW | 202041471 | 11/2020 | |
| TW | 202041471 A * | 11/2020 | |
| WO | 2009051612 | 4/2009 | |

OTHER PUBLICATIONS

"Office Action of Taiwan Counterpart Application", issued on Oct. 21, 2021, p. 1-p. 6.

* cited by examiner

WASTEWATER TREATMENT SYSTEM AND CLEANING METHOD THEREOF

CROSS-REFERENCE TO RELATED APPLICATION

This application claims the priority benefit of Taiwan application Ser. No. 110114896 filed on Apr. 26, 2021. The entirety of the above-mentioned patent application is hereby incorporated by reference herein and made a part of this specification.

TECHNICAL FIELD

The disclosure relates to a wastewater treatment system and a cleaning method thereof.

BACKGROUND

Electrodialysis (ED) apparatus is a wastewater treatment system that facilitates the conversion of salts in the wastewater into acids and bases to achieve sustainable resource recovery from wastewater and to reduce environmental pollution.

Conventional bipolar membrane electrodialysis apparatus includes an acid compartment, a wastewater compartment, and a base compartment arranged in sequence. During wastewater treatment process, the concentration of anions in the acid compartment and cations in the base compartment increase with time, while the concentration of anions and cations in the wastewater compartment decrease gradually. Moreover, substances in the wastewater such as organic compounds, calcium ions and magnesium ions are driven by electric field and migrate to a positive electrode or a negative electrode. In general, due to their large molecular weight and molecular radius, organic compounds having negative charges tend to adhere to an anion exchange membrane when migrating toward the acid compartment, causing organic fouling. Calcium ions and magnesium ions having positive charges are likely to cling to a cation exchange membrane when the ions migrate toward the base compartment, leading to ions precipitation which induces inorganic scaling. The formation of the organic fouling and inorganic scaling increases the electrical resistance of the wastewater treatment system, while lowering the efficiency and elevating the energy consumption of the whole wastewater treatment system, resulting in permanent damage of the anion exchange membrane and the cation exchange membrane under long-term operation.

SUMMARY

An embodiment of the disclosure discloses a wastewater treatment system, the structure of which includes: a wastewater compartment, a first electrode, a second electrode, an acid compartment, a base compartment, an acid supply apparatus, a base supply apparatus, a control apparatus, and a power supply device. The wastewater compartment receives wastewater influent. The first electrode and the second electrode are respectively arranged on the opposite sides of the wastewater compartment. The acid compartment is arranged between the wastewater compartment and the first electrode. The base compartment is arranged between the wastewater compartment and the second electrode. The acid supply apparatus links up with the acid compartment through a first channel and links up with the base compartment through a second channel. The base supply apparatus links up with the base compartment through a third channel and links up with the acid compartment through a fourth channel. The control apparatus is individually coupled to the first channel, the second channel, the third channel, and the fourth channel, in order to control the switching of the first channel, the second channel, the third channel and the fourth channel. The power supply device is electrically connected to the first electrode and the second electrode. The power supply device provides a positive voltage to the second electrode and a negative voltage to the first electrode, and the control apparatus shut off the first channel so that the acid supply apparatus provides an acid solution to the base compartment through the second channel, and the control apparatus shut off the third channel so that the base supply apparatus provides an alkaline solution to the acid compartment through the fourth channel.

Another embodiment of the disclosure discloses a cleaning method of the wastewater treatment system disclosed in the present disclosure, which method is suitable for cleaning the aforementioned wastewater treatment system after accomplishing a wastewater treatment process, which includes the following steps: providing a positive voltage to the second electrode and a negative voltage to the first electrode through the power supply device; shutting off the first and the third channels, and turning on the second and the fourth channel through the control apparatus; using the acid supply apparatus to provide the acid solution into the base compartment through the second channel; using the base supply apparatus to provide the alkaline solution to the acid compartment through the fourth channel.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In the disclosed embodiment, after operating the electrodialysis process to convert of salts in the wastewater into acids and bases for a period of time, the ion exchange membranes can be simultaneously cleaned to remove the organic fouling and the inorganic scaling, without needing to turn off the wastewater treatment system. Hence, the chance of damaging the ion exchange membranes can be effectively reduced, the cleaning process time can be shortened and the overall operation costs of the cleaning process can be lowered. The wastewater treatment system and the cleaning method thereof of the embodiment of the disclosure will be further described in detail below.

Figure 1:
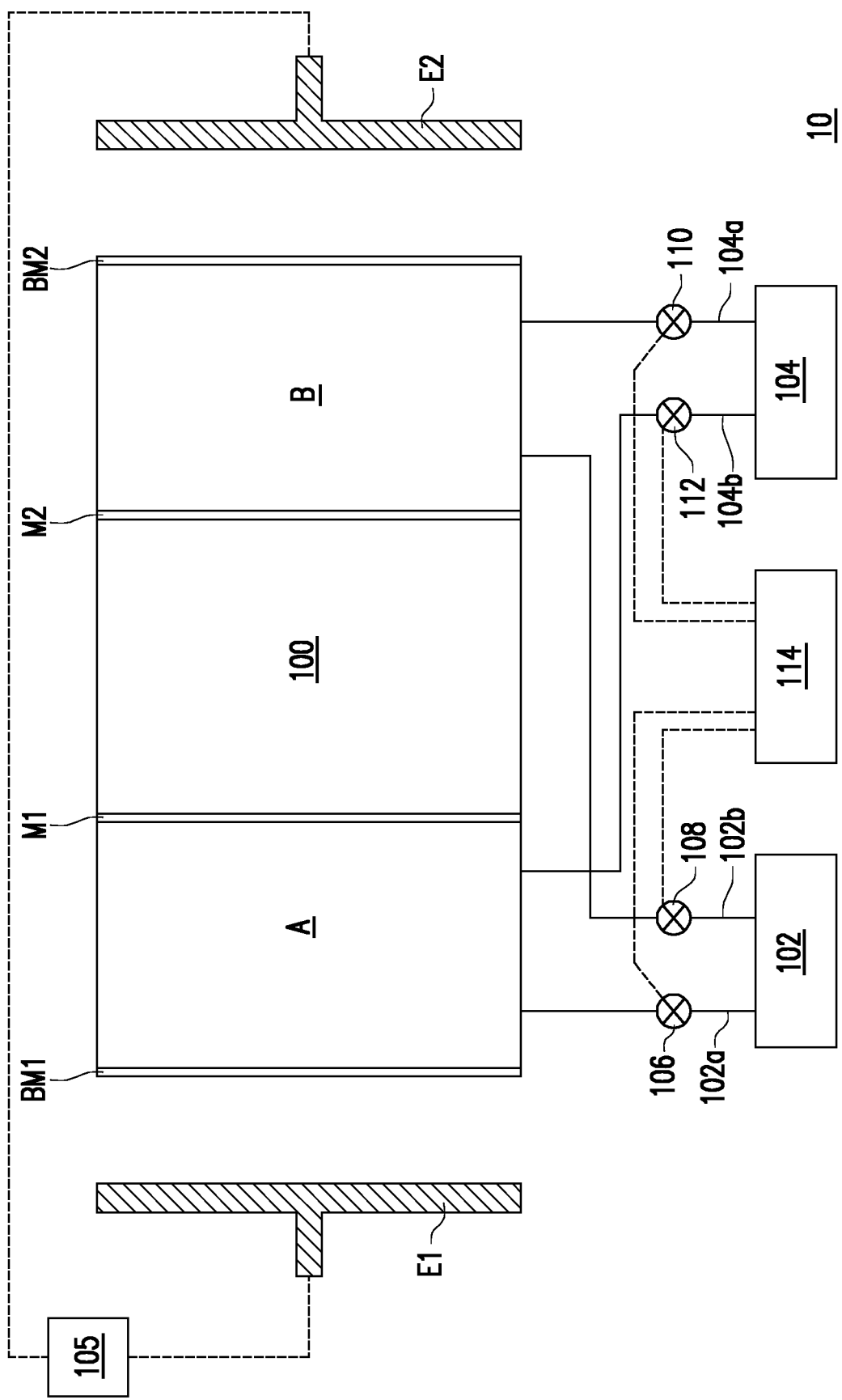
FIG. 1 is a diagram of the wastewater treatment system according to the first embodiment of the disclosure.

FIG. 1 is a diagram of the wastewater treatment system according to the first embodiment of the disclosure. The wastewater treatment system 10 includes a wastewater compartment 100, a first electrode E1, a second electrode E2, an acid compartment A, a base compartment B, an acid supply apparatus 102, a base supply apparatus 104, a power supply device 105 and a control apparatus 114. The wastewater compartment 100 is used to receive wastewater containing salts, inorganic substances, organic compounds, and the like. The first electrode E1 and the second electrode E2 are respectively arranged on opposite sides of the wastewater compartment 100.

The power supply device 105 is electrically connected to the first electrode E1 and the second electrode E2 to supply voltage to the first electrode E1 and the second electrode E2. When the power supply device 105 applies a positive bias voltage to the first electrode E1 and a negative bias voltage to the second electrode E2, the first electrode E1 serves as a positive electrode and the second electrode E2 acts as a negative electrode to generate electric potential difference required for the transport of ions of the salts in the wastewater. The anions and the organic compounds having negative charges move toward the first electrode E1, while the cations move toward the second electrode E2. As a result, the salt concentration in the wastewater can be reduced to accomplish wastewater treatment. In one embodiment, in the process of wastewater treatment, the applied voltage is, for example, between 1 V and 30 V, and the current density is, for example, between 10 mA/cm$^2$ and 100 mA/cm$^2$.

The acid compartment A is arranged between the wastewater compartment 100 and the first electrode E1. The acid compartment A is used to receive the acid solution provided by the acid supply device 102 and the anions discharged from the wastewater compartment 100. In this embodiment, the interface between the acid compartment A and the wastewater compartment 100 is an anion exchange membrane M1, and the wall of the acid compartment A adjacent to the first electrode E1 is a bipolar membrane BM1. During wastewater treatment process, the anions of the salts in the wastewater are attracted toward the first electrode E1, to cross the anion exchange membrane M1 and move toward to the acid compartment A and combine with the protons generated in the bipolar membrane BM1 to form an acid solution. Thus, the concentration of the acid solution in the acid compartment A increases with the wastewater treatment processing time, until the target concentration in the acid solution is reached to achieve the purpose of wastewater recycling.

In some embodiments, the acid supply apparatus 102 links up with the acid compartment A through the first channel 102a, and links up with the base compartment B through the second channel 102b. Here, a first valve 106 can be arranged in a first channel 102a, and a second valve 108 can be arranged in a second channel 102b. In consequence, when the wastewater treatment system 10 is in process, the first valve 106 is turned on and the second valve 108 is shut off, so that the acid supply apparatus 102 can deliver acid solution to the acid compartment A through the first channel 102a, while shutting off the second channel 102b to impede the acid solution flowing into the base compartment B.

Analogously, the base compartment B is disposed between the wastewater compartment 100 and the second electrode E2. The base compartment B is used to receive the alkaline solution provided by the base supply apparatus 104 and the cations discharged from the wastewater compartment 100. In this embodiment, the interface between the base compartment B and the wastewater compartment 100 is a cation exchange membrane M2, and the wall of the base compartment B adjacent to the second electrode E2 is a bipolar membrane BM2. During wastewater treatment process, the cations of the salts in the wastewater are attracted toward the second electrode E2, to cross the cation exchange membrane M2 and move toward to the base compartment B and combine with the hydroxyl generated in the bipolar membrane BM2 to form an alkaline solution. Thus, the concentration of the alkaline solution in the base compartment B increases with the wastewater treatment processing time, until the target concentration in the base solution is reached to achieve the goals of wastewater reuse.

In some embodiments, the base supply apparatus 104 links up with the base compartment B through the third channel 104a, and links up with the acid compartment A through the fourth channel 104b. Here, a third valve 110 can be arranged in the third channel 104a, and the fourth valve 112 can be arranged in the fourth channel 104b. As a result, when the wastewater treatment system 10 is in process, the third valve 110 is turned on and the fourth valve 112 is shut off, so that the base supply apparatus 104 can supply alkaline solution to the base compartment B through the third channel 104a, while shutting off the fourth channel 104b to hinder the alkaline solution flowing into the acid compartment A.

In some embodiments, the control apparatus 114 may be individually coupled with the first valve 106, the second valve 108, the third valve 110, and the fourth valve 112, to control the switching of the first valve 106, the second valve 108, the third valve 110 and the fourth valve 112, respectively, but the present disclosure is not limited to this.

In some embodiments, the delivery of the acid and the alkaline solution is controlled by valves installed in each channel, but the present disclosure is not limited to this. In another embodiments, the acid supply apparatus 102 may be connected to a channel, and the channel may be switched to the acid compartment A or the base compartment B by the control apparatus 114 or other suitable switching apparatus. Similarly, the base supply apparatus 104 may be connected to a channel, and the channel may be switched to the acid compartment A or the base compartment B by the control device 114 or other suitable switching devices.

After the wastewater has been treated by the wastewater treatment system 100 for a period of time, the potential driven negatively charged organic compounds move toward the positive electrode, but cannot pass through the anion exchange membrane M1 due to their large molecular weight and molecular radius, implying the formation of organic fouling on the membrane. In the same way, inorganic scaling is likely to occur on the cation exchange membrane M2, when the cations in the wastewater moving toward the negative electrode. Therefore, the wastewater treatment system 10 needs to be cleaned periodically to remove the organic fouling and inorganic scaling, to maintain the performances of the anion exchange membrane M1 and the cation exchange membrane M2.

Traditional wastewater treatment system needs to be shut off in order to simultaneously supply the acid solution into the acid compartment and the base compartment for acid cleaning purpose; and to concurrently supply the alkaline solution into the acid compartment and base compartment for alkaline cleaning. As a result, a large amount of acid and alkaline solutions will be consumed, and the cleaning process time will increase accordingly.

Conversely, in the present embodiment, after the wastewater treatment system has proceeded treating the wastewater for a period of time, the cleaning process can be directly operated without shutting off the wastewater treatment system, so that the efficiency of the wastewater treatment process can be effectively improved. During the cleaning process, it is not necessary to simultaneously supply the acid solution to the acid compartment and the base compartment, and there is no need to provide the alkaline solution to the acid compartment and the base compartment at the same time; thus avoiding huge consumption of acid and alkaline solutions.

Figure 6:
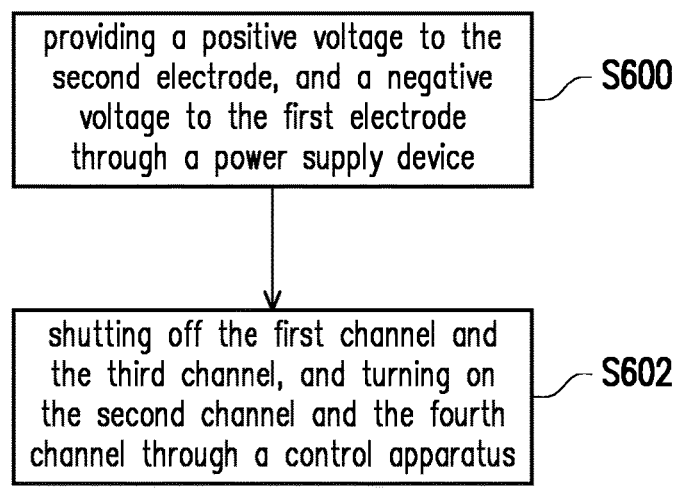
FIG. 6 is a flowchart of the cleaning method of the wastewater treatment system according to the first embodiment of the disclosure.

FIG. 6 is a flowchart of the cleaning method of the wastewater treatment system according to the first embodiment of the disclosure. Referring to FIG. 6, in step S600, the power supply device 105 provides a positive voltage to the second electrode E2 and a negative voltage to the first electrode E1. Compared to the wastewater treatment process, the second electrode E2 acts as a positive electrode and the first electrode E1 behaves as a negative electrode. Therefore, step S600 can be regarded as a reverse electrode step. In step S602, the first channel 102a and the third channel 104a are shut off and the second channel 102b and the fourth channel 104b are turned on by the control apparatus 114. During the cleaning process, the acid supply device 102 supplies acid solution into the base compartment B through the second channel 102b, and the base supply device 104 provides alkaline solution into the acid compartment A through the fourth channel 104b. In this embodiment, step S602 is carried out after step S600, but the disclosure is not limited to this. In other embodiments, step S600 may be operated sequentially after step S602, or step S600 and step S602 may be conducted simultaneously.

In detail, after the wastewater treatment system 10 has treated the wastewater for a period of time, the wastewater treatment system 10 can be cleaned without turning off the system. During the cleaning process, the power supply device 105 is switched to apply reverse potential to the electrode, i.e. a negative voltage to the first electrode E1 and a positive voltage to the second electrode E2. In an embodiment, the power supply device 105 can be switched manually, and a negative voltage is applied to the first electrode E1 and a positive voltage is applied to the second electrode E2. In another embodiment, the power supply device 105 may be coupled to the control apparatus 114 or another control apparatus, so that the power supply device 105 switching can be handled by the control apparatus 114. During cleaning process, the first valve 106 is shut off and the second valve 108 is turned on, so that the acid supply device 102 can supply acid solution to the base compartment B through the second channel 102b, and the first channel 102a is shut off to impede the acid solution flowing into the acid compartment A. At the same time, the third valve 110 is shut off and the fourth valve 112 is turned on, so that the base supply device 104 can supply alkaline solution to the acid compartment A through the fourth channel 104b, and the third channel 104a is shut off to hinder the alkaline solution flowing into the base compartment B. In this embodiment, the first valve 106, the second valve 108, the third valve 110, and the fourth valve 112 are controlled by the control apparatus 114.

Hence, a negative voltage is applied to the first electrode E1 and a positive voltage is applied to the second electrode E2, the alkaline solution is delivered to the acid compartment A, while the acid solution is transferred to the base compartment. During the cleaning process, the hydroxyl ions of the alkaline solution in the acid compartment A are attracted toward to the second electrode E2, and move toward the wastewater compartment 100; while the protons of the acid solution in the base compartment B are attracted toward the first electrode E1, and move toward the wastewater compartment 100. When the hydroxyl ions induced by the second electrode E2 cross the anion exchange membrane M1, the charged components of organic fouling previously attached to the anion exchange membrane M1 are removed through the migration of the hydroxyl ions. Moreover, when protons attracted toward the first electrode E1 cross the cation exchange membrane M2, the inorganic scaling generated on the cation exchange membrane can be disintegrated through the migration of the protons. Therefore, by changing the electrode polarity with simultaneous switch of the acid and base solution, both the suspended organic fouling and inorganic (precipitates) scaling can be effectively removed from the anion exchange membrane M1 and the cation exchange membrane M2 respectively, without needing to shut off the wastewater treatment system 10.

Figure 2:
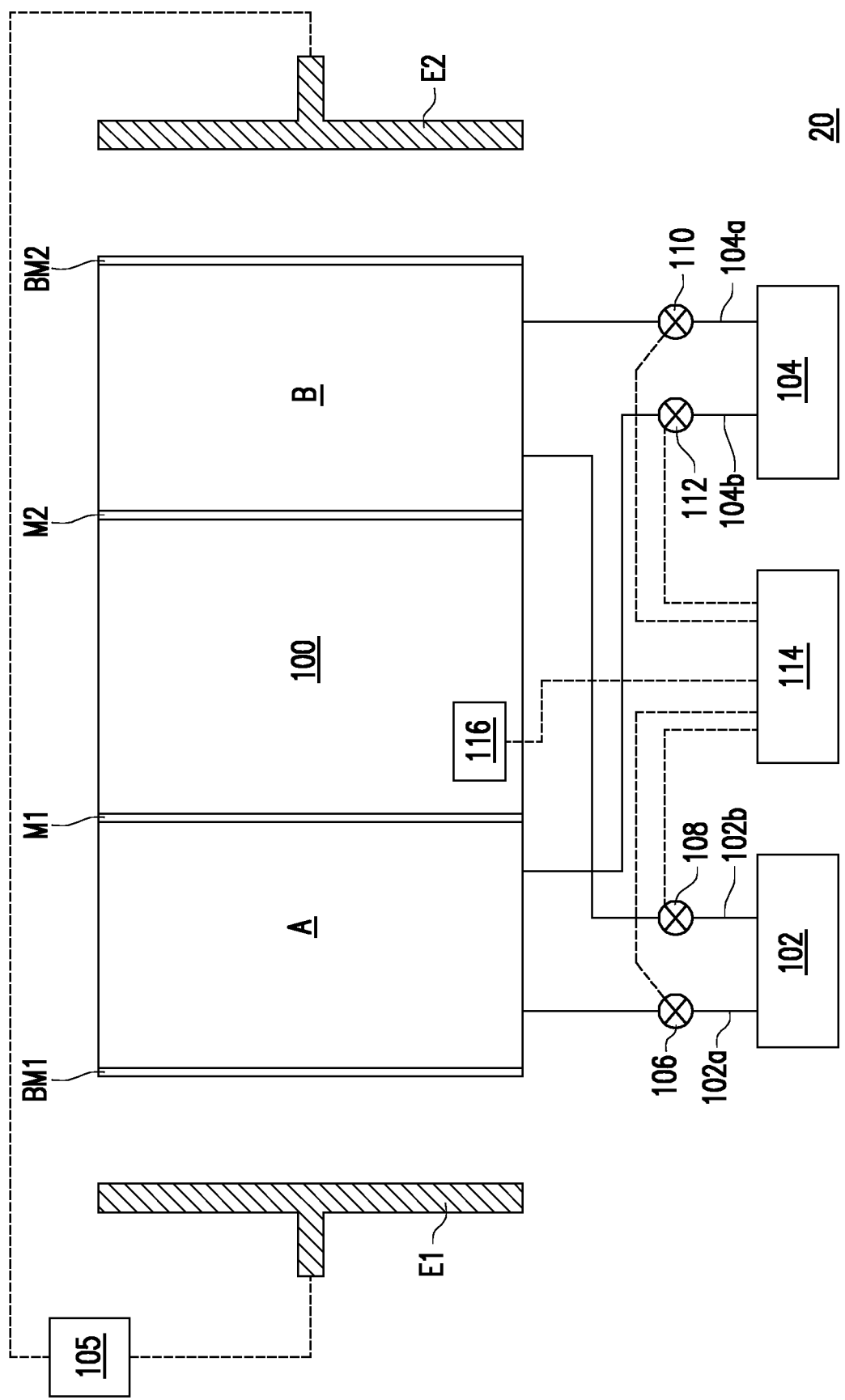
FIG. 2 is a diagram of the wastewater treatment system according to the second embodiment of the disclosure.

FIG. 2 is a diagram of a wastewater treatment system according to the second embodiment of the disclosure. In this embodiment, the same components as those in the first embodiment will be denoted by the same reference numerals and will not be described again. Please refer to FIG. 2, in this embodiment, the difference between the wastewater treatment system 20 and the wastewater treatment system 10 is that the wastewater treatment system 20 further includes a pressure detection apparatus 116. The pressure detecting apparatus 116 is arranged at the water inlet end of the wastewater compartment 100 to detect the water pressure of the wastewater admitting into the wastewater compartment 100. When the water pressure detected by the pressure detecting apparatus 116 exceeds a set value of the water pressure, it indicates that the ion exchange membranes of the wastewater treatment system 20 may have too much organic fouling and inorganic scaling on it, resulting in a higher flow resistance. Under this circumstance, the wastewater treatment system needs to be cleaned as described above. In this embodiment, the pressure detection apparatus 116 is coupled to the control apparatus 114. Thus, when the water pressure detected by the pressure detecting apparatus 116 exceeds the first water pressure setting value, the control apparatus 114 can instantly control the switching of the first valve 106, the second valve 108, the third valve 110, and the fourth valve to start operating the cleaning process.

In one embodiment, when the water pressure detected by the pressure detecting apparatus 116 increases by 10% to 50% compared to the original water pressure, the cleaning process is started. In addition, during the cleaning process, when the water pressure detected by the pressure detecting device 116 drops to a second water pressure setting value, which indicates that the wastewater treatment system has been cleaned, the control apparatus 114 can again control the switching of the first valve 106, the second valve 108, third valve and the forth valve 112 to start operating wastewater treatment. The above-mentioned the first water pressure setting value and the second water pressure setting value may be the same or different depending on wastewater treatment demand.

Figure 7:
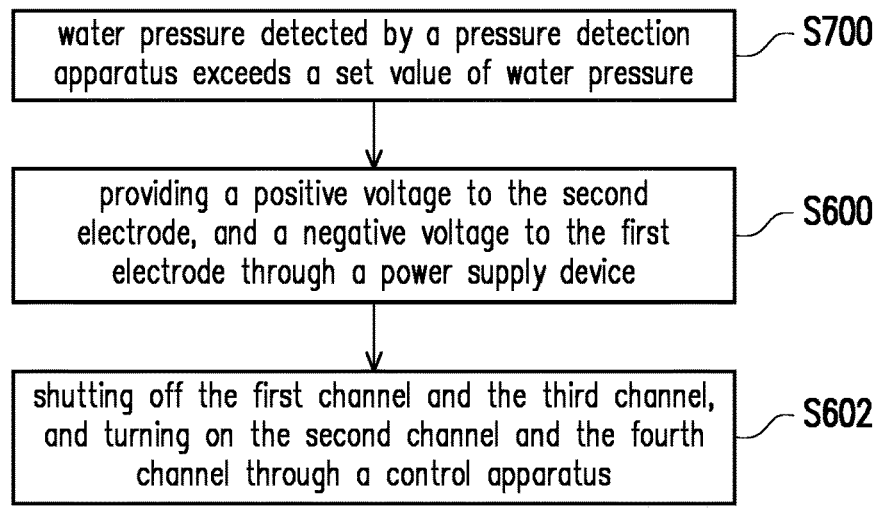
FIG. 7 is a flowchart of the cleaning method of the wastewater treatment system according to the second embodiment of the disclosure.

FIG. 7 is a flowchart of a cleaning method of the wastewater treatment system according to a second embodiment of the disclosure. Referring to FIG. 7, in step S700, as the water pressure detected by the pressure detecting apparatus 116 exceeds a water pressure setting value, a cleaning process is activated, as described in step S600 and step S602 in FIG. 6.

Figure 3:
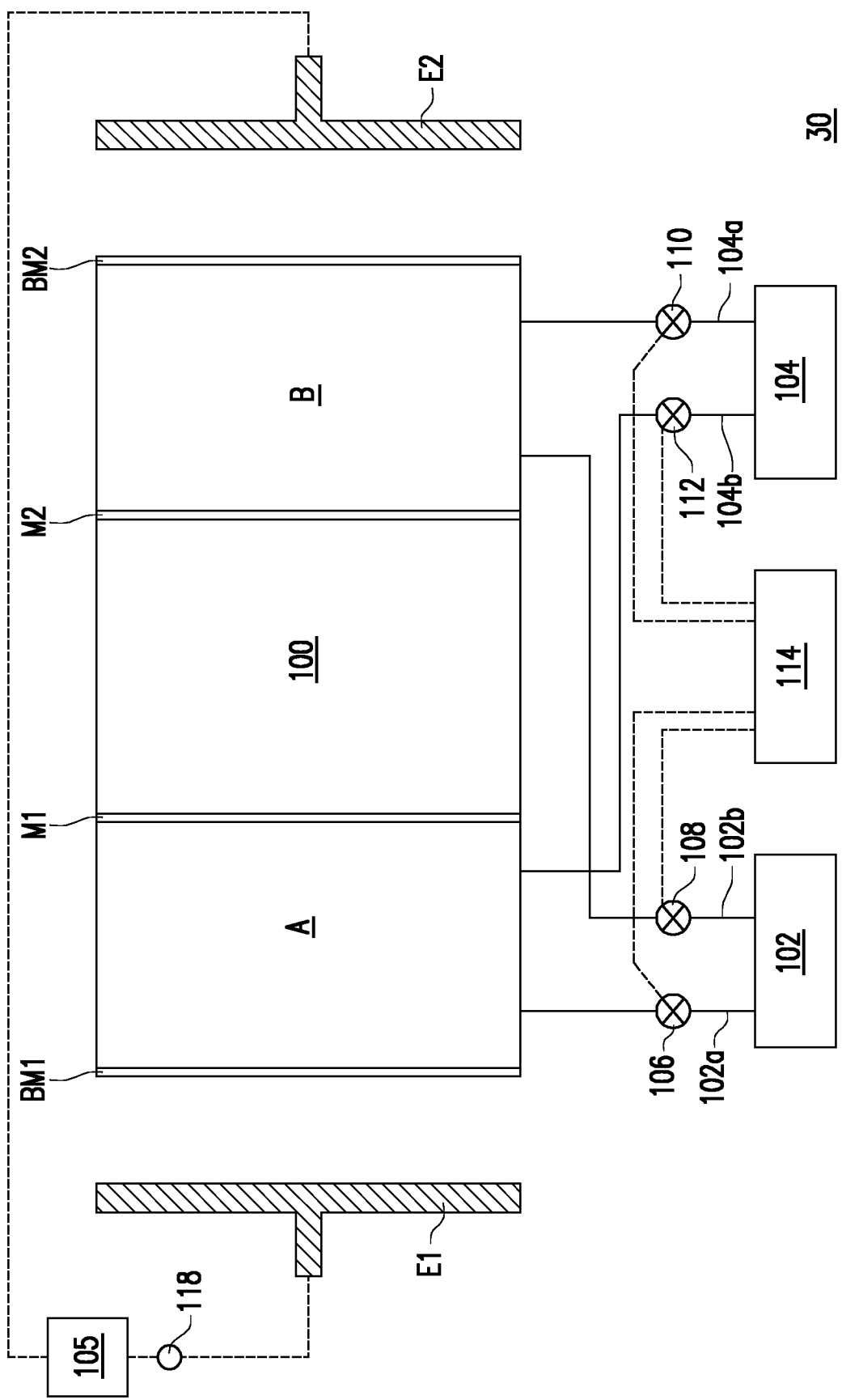
FIG. 3 is a diagram of the wastewater treatment system according to the third embodiment of the disclosure.

FIG. 3 is a diagram of a wastewater treatment system according to the third embodiment of the disclosure. In this embodiment, the same components as those in the first embodiment will be denoted by the same reference numerals and will not be described again. Please refer to FIG. 3, in this embodiment, the difference between the wastewater treatment system 30 and the wastewater treatment system 10 is that the wastewater treatment system 30 includes a current detection apparatus or a voltage detection apparatus 118. In this embodiment, the current detection apparatus or voltage detection apparatus 118 is arranged in a position adjacent to the power supply device 105 to detect the current or voltage of the wastewater treatment system during wastewater treatment process. In another embodiment, the current detection apparatus or the voltage detection apparatus 118 can be integrated into the power supply device 105. When the current detection apparatus detects that the current (at a fixed voltage setting value) is lower than a current setting value or the voltage detection apparatus detects that the voltage (at a fixed current setting value) is higher than a voltage setting value, it indicates that the ion exchange membranes of the wastewater treatment system 30 may have too much organic fouling and inorganic scaling on it. Under this circumstance, the wastewater treatment system needs to be cleaned as described above. In this embodiment, the current detection apparatus or voltage detection apparatus 118 is coupled to the control apparatus 114.

Hence, when the current detection apparatus detects that the current (at a fixed voltage setting value) is lower than a first current setting value or the voltage detection apparatus detects that the voltage (at a fixed current setting value) is higher than a first current setting value, the control apparatus 114 can instantly control the switching of the first valve 106, the second valve 108, the third valve 110, and the fourth valve 112 to start operating the cleaning process. In one embodiment, when the current detected by the current detecting apparatus at a fixed voltage is 10% to 50% lower than the original current, the cleaning process is started. Alternatively, in one embodiment, when the voltage detected by the voltage detection apparatus at a fixed current is increased by 10% to 50% compared to the original voltage, the cleaning process is started.

In addition, during the cleaning process, when the current detection apparatus detects that the current at a fixed voltage setting value reaches a second current setting value or the voltage detection apparatus detects the voltage at a fixed current setting value drops to a second voltage setting value, the control apparatus 114 can again control the switching of the first valve 106, the second valve 108, the third valve 110, and the fourth valve 112 to start operating wastewater treatment. The above-mentioned a first voltage/current setting value and a second voltage/current setting value may be the same or different depending on the wastewater treatment demand.

Figure 8:
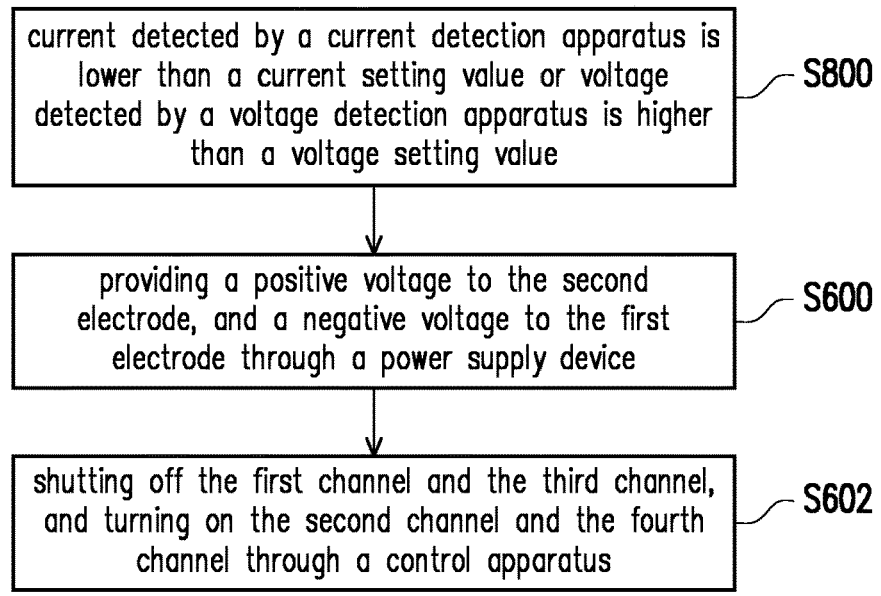
FIG. 8 is a flowchart of the cleaning method of the wastewater treatment system according to the third embodiment of the disclosure.

FIG. 8 is a flowchart of a cleaning method of the wastewater treatment system according to a third embodiment of the disclosure. Referring to FIG. 8, in step S800, as the current detecting apparatus detects that the current at a fixed voltage setting value is lower than a current setting value or the voltage detecting apparatus detects that the voltage at a fixed current setting value is higher than a voltage setting value, a cleaning process is activated, as described in step S600 and step S602 in FIG. 6.

Figure 4:
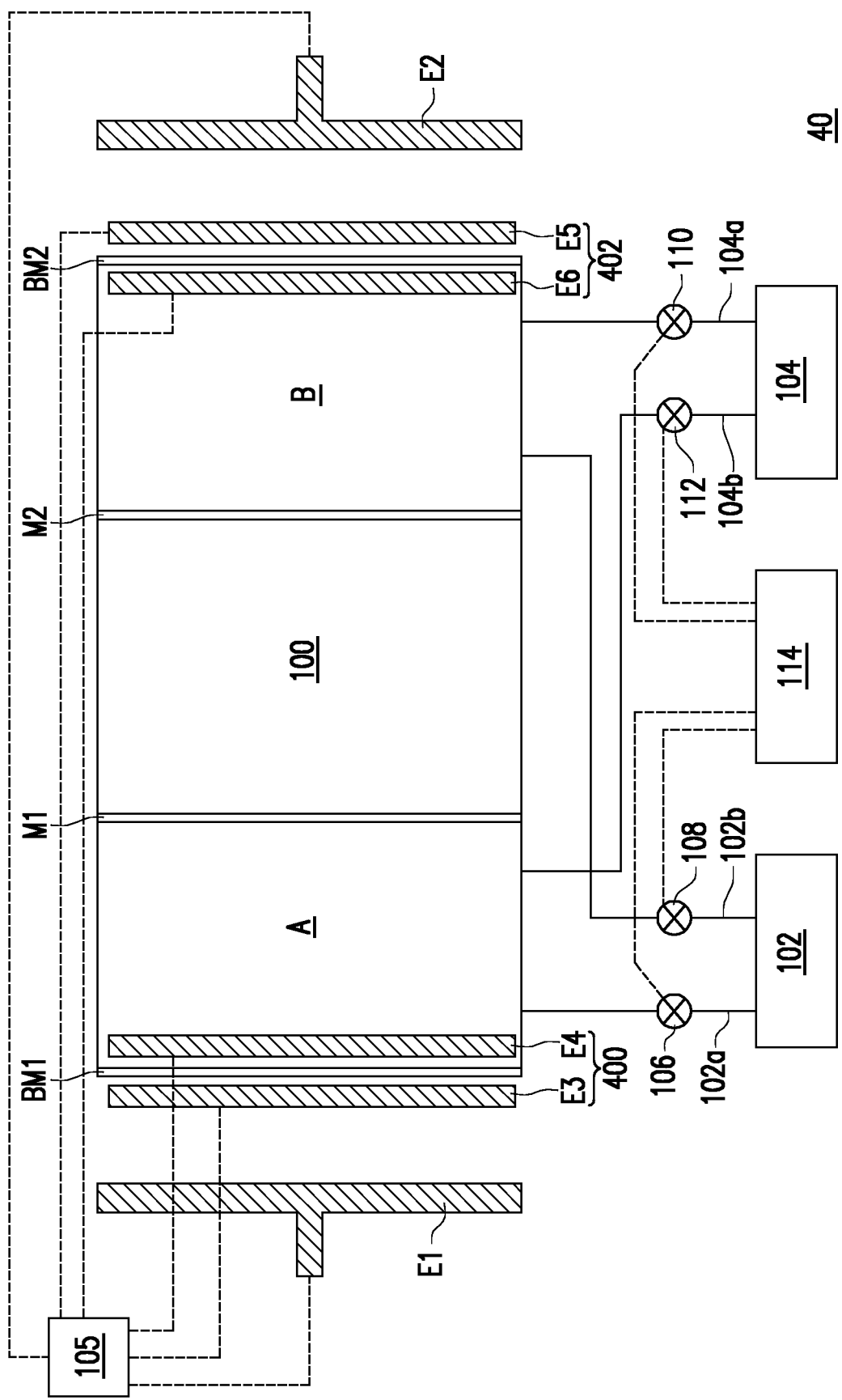
FIG. 4 is a diagram of the wastewater treatment system according to the fourth embodiment of the disclosure.

FIG. 4 is a diagram of a wastewater treatment system according to the fourth embodiment of the disclosure. In this embodiment, the same components as those in the first embodiment will be denoted by the same reference numerals and will not be described again. Here, the difference between the wastewater treatment system 40 and the wastewater treatment system 10 is that the wastewater treatment system 40 includes a first group of electrodes 400 and a second group of electrodes 402. The first group of electrodes 400 is arranged on both side of the bipolar membrane BM1, such that the first group of electrodes 400 includes a third electrode E3 and a fourth electrode E4 respectively arranged around of the wall of the acid compartment A adjacent to the first electrode E1. The second group of electrodes 402 is arranged on both side of the bipolar membrane BM2, that is, the second group of electrodes 402 includes a fifth electrode E5 and a sixth electrode E6 respectively arranged around the wall of the base compartment B adjacent to the wall of the second electrode E2. The third electrode E3 is arranged between the first electrode E1 and the acid compartment A, the fourth electrode E4 is arranged in the acid compartment A, the fifth electrode E5 is arranged between the second electrode E2 and the base compartment B. and the sixth electrode E6 is arranged in the base compartment B. The power supply device is electrically connected to the first electrode E1, the second electrode E2, the third electrode E3, the fourth electrode E4, the fifth electrode E5, and the sixth electrode E6, respectively.

In this embodiment, when the wastewater treatment system 40 operates cleaning process, in addition to applying a negative voltage to the first electrode E1 and a positive voltage to the second electrode E2, the power supply device 105 also applies a positive voltage to the third electrode E3 and the sixth electrode E6, and a negative voltage to the fourth electrode E4 and the fifth electrode E5. Hence, during the cleaning process, cations of the alkaline solution in the acid compartment A can be effectively prevented from being attracted toward the first electrode E1, which migration may damage the bipolar membrane. Similarly, anions of the acid solution in the base compartment B can be effectively prevented from being attracted toward the second electrode E2; which migration may also damage the bipolar membrane.

Figure 9:
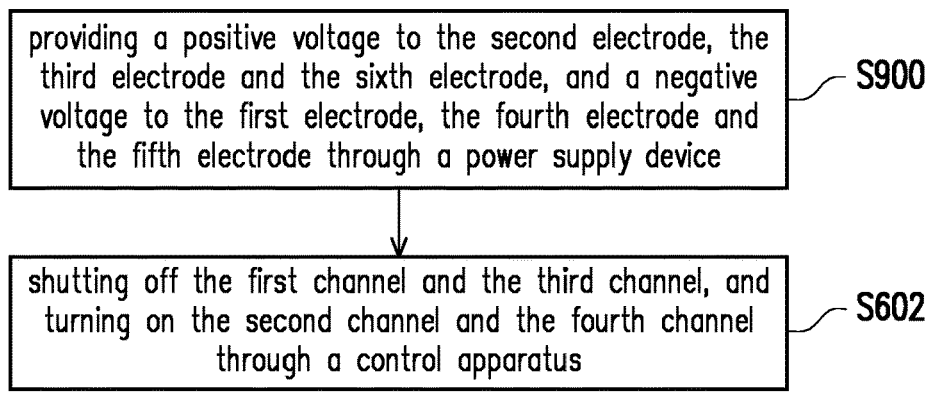
FIG. 9 is a flowchart of the cleaning method of the wastewater treatment system according to the fourth embodiment of the disclosure.

FIG. 9 is a flowchart of a cleaning method of a wastewater treatment system according to the fourth embodiment of the disclosure. Referring to FIG. 9, in step S900, the power supply device 105 provides a positive voltage to the second electrode E2, the third electrode E3, and the sixth electrode E6, and provides a negative voltage to the first electrode E1, the fourth electrode E4, and the fifth electrode E5. Next, step S602 in FIG. 6 is carried out.

In particular, depending on the requirements of the wastewater treatment process, the pressure detection apparatus 116 in the second embodiment, the current detection apparatus or voltage detection apparatus 118 in the third embodiment, and the first group of electrodes 400 and the second group of electrodes 402 arrangement in the fourth embodiment, two out of the three embodiments can be simultaneously arranged in the same wastewater treatment system.

Below, several experiments are provided to verify the efficacy of the embodiments of the disclosure, but the scope of the disclosure is not limited to the following.

The wastewater treatment system 10 of the first embodiment of the present disclosure is adopted. Added 200 mg/L of calcium, magnesium and humic acid (the source of inorganic fouling and organic fouling) into 1 L of 2.5 wt % wastewater (containing 1.5% NaCl and 0.8% $Na_2SO_4$), 0.25 L HCl (0.2M) acid solution and 0.25 L NaOH (0.2M) alkaline solution were provided, 0.3M $Na_2SO_4$ aqueous solution was used as electrolyte in both the positive electrode and the negative electrode compartment.

The wastewater treatment process was operated at an operating voltage of 7 V. In addition, after the wastewater system ran for a period of time, a cleaning process was operated by applying a reverse potential field to the system, and supplying 1 wt % of NaOH solution into an acid compartment and 1 wt % of HCl solution into a base compartment, to remove the inorganic scaling and organic fouling on the ion exchange membrane.

Figure 5:
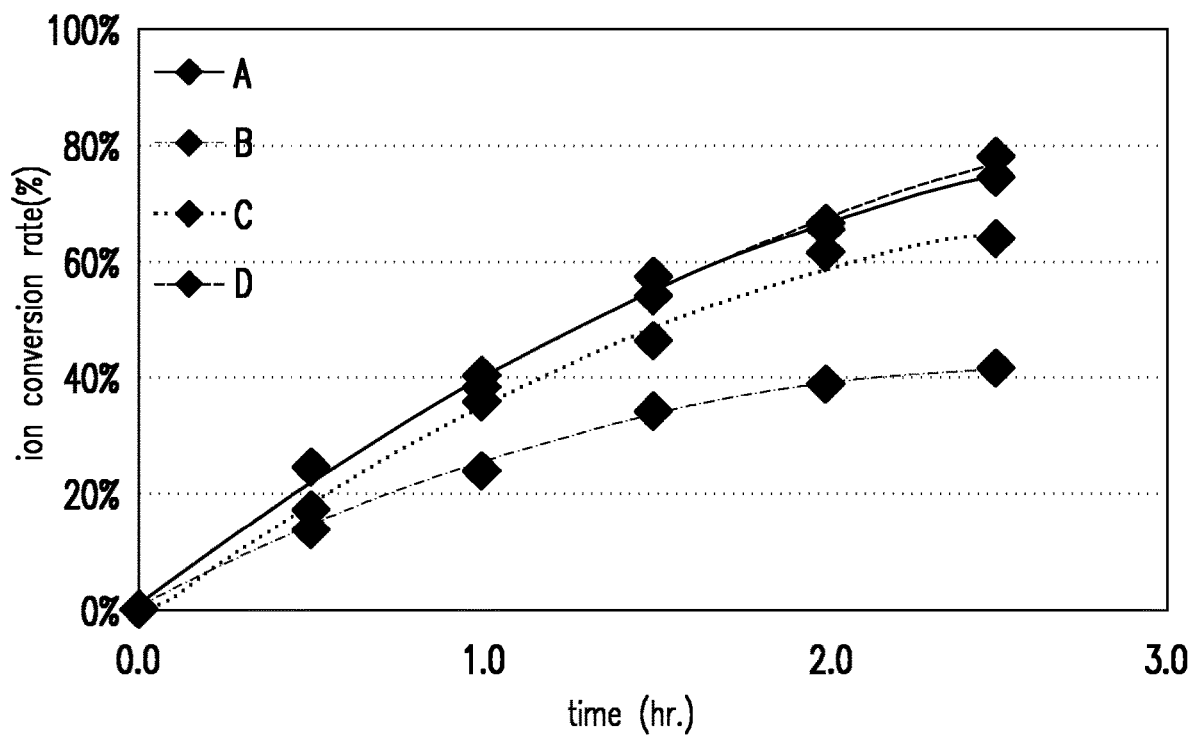
FIG. 5 is a diagram showing the relationship between the ions conversion rate and wastewater treatment processing time of the disclosed wastewater treatment system.

FIG. 5 is a diagram showing the relationship between the ion conversion rate and the processing time of the wastewater treatment system disclosed in the present disclosure. Curve A shows the relationship between the ion conversion efficiency and the processing time after admitting the wastewater to the system for 2.5 hours, curve B shows the relationship between the ion conversion efficiency and the processing time with the coexistence of inorganic scaling, and curve C shows the relationship between the ion conversion efficiency and the processing time with the coexistence of organic fouling. Curve D shows the relationship between the ion conversion efficiency and processing time after cleaning process. It can be seen from FIG. 5 that after the cleaning process, the ion conversion efficiency of the wastewater treatment system of the present disclosure increases to 80%, and the recovery rate reaches 99%.

Experimental Example 2

A wastewater containing 1.5% NaCl, 0.8% Na2SO4, 200 mg/L calcium ions, and 200 mg/L magnesium ions was treated in two experimental batches at a constant voltage for 2.0 hours. In the first experimental batch, after treating the wastewater separately with a traditional wastewater treatment system and with a wastewater treatment system 10 of the disclosed embodiment, the conductivity of the wastewater dropped from 34 mS/cm to 22 mS/cm, and the current value decreased from 4 A drops to 1 A.

Then, the traditional wastewater treatment system was cleaned with the following steps: 1, shut off the wastewater system, 2, supplied 1% (v/v) HCl solution into the acid and base compartments simultaneously for 30 minutes, 3, supplied 1% (v/v) NaOH solution into the acid and base compartments simultaneously for 30 minutes. In comparison, the water treatment system 10 of the embodiment of the present disclosure was cleaned for 30 minutes with the following steps: 1, applied a negative voltage to the positive electrode compartment, and applied a positive potential to the negative electrode compartment, 2, supplied 1% (v/v) NaOH solution into the acid compartment, and supplied 1% (v/v) HCl solution into the base compartment. After the aforementioned cleaning steps, a second experimental batch was carried by retreating the same wastewater at a constant voltage for 2 hours. In the second experimental batch, the conductivity of the wastewater dropped insignificantly to 27 mS/cm, after treating the wastewater with the traditional wastewater treatment system. In contrast, after treating the wastewater with the wastewater treatment system 10 of the disclosed embodiment, the conductivity of the wastewater could be reduced to 23 mS/cm, which indicates that the wastewater treatment system 10 of the disclosed embodiment had a higher recovery efficiency (greater than 90%).

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A wastewater treatment system, comprising:
a wastewater compartment for receiving wastewater;
a first electrode and a second electrode, respectively arranged on opposite sides of the wastewater compartment;
an acid compartment, arranged between the wastewater compartment and the first electrode;
a base compartment, arranged between the wastewater compartment and the second electrode;
an acid supply apparatus, links up with the acid compartment through a first channel and links up with the base compartment through a second channel;
a base supply apparatus, links up with the base compartment through a third channel and links up with the acid compartment through a fourth channel;
a control apparatus, individually coupled to the first channel, the second channel, the third channel, and the fourth channel to control the switching of the first channel, the second channel, and the third channel, and the fourth channel, respectively;
a power supply device, electrically connected to the first electrode and the second electrode;
a first group of electrodes, comprising a third electrode and a fourth electrode respectively arranged around the wall of the acid compartment adjacent to the first electrode; and
a second group of electrodes, comprising a fifth electrode and a sixth electrode respectively arranged around the wall of the base compartment adjacent to the second electrode,
wherein the power supply device provides a positive voltage to the second electrode and a negative voltage to the first electrode, and the control apparatus shuts off the first channel so that the acid supply apparatus provides acid solution through the second channel, and the control apparatus shut off the third channel so that the base supply apparatus provides alkaline solution through the fourth channel,
the third electrode is arranged between the first electrode and the acid compartment, the fourth electrode is arranged in the acid compartment, and the fifth electrode is arranged between the second electrode and the base compartment, the sixth electrode is arranged in the base compartment, and the power supply device is electrically connected to the first electrode, the second electrode, the third electrode, the fourth electrode, and the fifth electrode and the sixth electrode, respectively; and
the power supply device further provides a positive voltage to the third electrode and the sixth electrode and a negative voltage to the fourth electrode and the fifth electrode.

2. The wastewater treatment system according to claim 1, wherein the wall of the acid compartment adjacent to the first electrode is a bipolar membrane.

3. The wastewater treatment system according to claim 1, wherein the wall of the base compartment adjacent to the second electrode is a bipolar membrane.

4. The wastewater treatment system according to claim 1, wherein the interface between the wastewater compartment and the acid compartment is a first ion exchange membrane, and the interface between the wastewater compartment and the base compartment is a second ion exchange membrane, wherein the first ion exchange membrane and the second ion exchange membrane have different polarities.

5. The wastewater treatment system according to claim 1, further comprising a first valve, a second valve, a third valve, and a fourth valve, wherein the first valve is arranged in the first channel, and the second valve is arranged in the second channel, the third valve is arranged in the third channel, the fourth valve is arranged in the fourth channel, and the control apparatus is individually coupled to the first valve, the second valve, the third valve, and the fourth valve to control the switching of the first valve, the second valve, the third valve, and the fourth valve, respectively.

6. The wastewater treatment system according to claim 1, further comprising a pressure detection apparatus, arranged at the inlet end of the wastewater compartment.

7. The wastewater treatment system according to claim 6, wherein the pressure detection apparatus is coupled to the control apparatus.

8. The wastewater treatment system according to claim 1, further comprising a current detection apparatus, arranged at a position adjacent to the power supply device or integrated in the power supply device.

9. The wastewater treatment system according to claim 8, wherein the current detection apparatus is coupled to the control apparatus.

10. The wastewater treatment system according to claim 1, further comprising a voltage detection apparatus, which is arranged at a position adjacent to the power supply device or integrated in the power supply device.

11. The wastewater treatment system according to claim 10, wherein the voltage detection device is coupled to the control apparatus.

12. A method for cleaning a wastewater treatment system, suitable for cleaning the wastewater treatment system according to claim 1 after wastewater treatment, comprising the following steps:
providing a positive voltage to the second electrode and a negative voltage to the first electrode through the power supply device;
shutting off the first channel and the third channel, and turning on the second channel and the fourth channel through the control apparatus;
using the acid supply apparatus to provide the acid solution into the base compartment through the second channel;
using the base supply apparatus to provide the alkaline solution to the acid compartment through the fourth channel; and
providing a positive voltage to the third electrode and the sixth electrode and a negative voltage to the fourth electrode and the fifth electrode through the power supply device.

13. The method for cleaning the wastewater treatment system according to claim 12, wherein the wastewater treatment system further comprising a first valve, a second valve, a third valve, and a fourth valve, wherein the first valve is arranged in the first channel, and the second valve is arranged in the second channel, the third valve is arranged in the third channel, the fourth valve is arranged in the fourth channel, and the control apparatus is individually coupled to the first valve, the second valve, the third valve, and the fourth valve; and
the method for cleaning the wastewater treatment system further comprises controlling the switching of the first valve, the second valve, the third valve, and the fourth valve through the control apparatus.

14. The method for cleaning the waste water treatment system according to claim 12, wherein the waste water treatment system further comprising a pressure detection apparatus arranged at the inlet end of the wastewater compartment, wherein the pressure detection device is coupled to the control device; and the cleaning method of the wastewater treatment system further comprising:
shutting off the first channel and the third channel, and turning on the second channel and the fourth channel, when the water pressure detected by the pressure detection apparatus exceeds a set value of water pressure.

15. The method for cleaning a wastewater treatment system according to claim 12, wherein the wastewater treatment system further comprising a current detection apparatus arranged at a position adjacent to the power supply device or integrated in the power supply device, wherein the current detection apparatus is coupled to the control apparatus, and the cleaning method of the wastewater treatment system further comprising:
shutting off the first channel and the third channel, and turning on the second channel and the fourth channel, when the current detected at a fixed voltage setting value is lower than a current setting value.

16. The method for cleaning a wastewater treatment system according to claim 12, wherein the wastewater treatment system further comprising a voltage detection apparatus arranged at a position adjacent to the power supply device or integrated in the power supply device, wherein the voltage detection apparatus is coupled to the control apparatus, and the cleaning method of the wastewater treatment system further comprising:
shutting off the first channel and the third channel, and turning on the second channel and the fourth channel, when the voltage detected at a fixed current setting value is higher than a voltage setting value.

* * * * *